United States Patent
Tetsuji

(10) Patent No.: US 7,650,018 B2
(45) Date of Patent: Jan. 19, 2010

(54) IMAGE CREATION DEVICE, IMAGE CREATION METHOD, AND IMAGE CREATION PROGRAM

(75) Inventor: Maeiwa Tetsuji, Wakayama (JP)

(73) Assignee: Shima Seiki Manufacturing, Ltd., Wakayama (JP)

(*) Notice: Subject to any disclaimer, the term of this patent is extended or adjusted under 35 U.S.C. 154(b) by 392 days.

(21) Appl. No.: 10/587,930

(22) PCT Filed: Jan. 28, 2005

(86) PCT No.: PCT/JP2005/001651

§ 371 (c)(1),
(2), (4) Date: Aug. 2, 2006

(87) PCT Pub. No.: WO2005/076209

PCT Pub. Date: Aug. 18, 2005

(65) Prior Publication Data

US 2007/0127839 A1    Jun. 7, 2007

(30) Foreign Application Priority Data

Feb. 3, 2004   (JP) ............................. 2004-026275
Dec. 14, 2004  (JP) ............................. 2004-360811

(51) Int. Cl.
*G06K 9/00* (2006.01)
(52) U.S. Cl. ............... 382/111; 382/118; 382/275; 382/154; 382/284; 356/492; 345/589; 345/619; 345/629

(58) Field of Classification Search ............ 66/232, 66/237; 700/130, 141, 132, 135; 382/111, 382/275, 118, 154, 284; 345/589, 619, 629; 356/492

See application file for complete search history.

(56) References Cited

U.S. PATENT DOCUMENTS

| | | | | |
|---|---|---|---|---|
| 6,377,269 B1 * | 4/2002 | Kay et al. | ..................... | 345/589 |
| 6,389,155 B2 * | 5/2002 | Funayama et al. | .......... | 382/118 |
| 6,895,787 B2 * | 5/2005 | Maeiwa | ....................... | 66/232 |
| 7,277,572 B2 * | 10/2007 | MacInnes et al. | ........... | 382/154 |
| 7,324,166 B1 * | 1/2008 | Joslin et al. | ................. | 348/722 |
| 7,333,202 B2 * | 2/2008 | Birlem | ....................... | 356/429 |
| 7,379,786 B2 * | 5/2008 | Koichi | ........................ | 700/135 |
| 7,386,360 B2 * | 6/2008 | Noriyuki | .................... | 700/131 |
| 2003/0085907 A1 * | 5/2003 | Matsuoka et al. | ........... | 345/619 |

FOREIGN PATENT DOCUMENTS

| | | | |
|---|---|---|---|
| JP | 60-002238 A | | 1/1985 |
| JP | 09-179977 A | | 7/1997 |
| JP | 09179977 | * | 7/1997 |

* cited by examiner

*Primary Examiner*—Vikkram Bali
*Assistant Examiner*—Nancy Bitar
(74) *Attorney, Agent, or Firm*—Rothwell, Figg, Ernst & Manbeck, PC

(57) ABSTRACT

A captured image of an object is input twice using a white background and a black background, after which the opacity D and the color image X of the object are obtained to yield an object image. It is possible to easily create a high-quality real image.

9 Claims, 16 Drawing Sheets

(Prior Art)

IMAGE CREATION DEVICE, IMAGE CREATION METHOD, AND IMAGE CREATION PROGRAM

This application is a 35 USC § 371 National Phase Entry Application from PCT/JP2005/001651, filed Jan. 28, 2005, and designating the United States.

TECHNICAL FIELD

The present invention relates to the creation of images such as yarn images or the like. The created yarn images can be used for creating simulated images of textile products such as knitted products, and the invention allows creating images portraying details like fluff, transparencies or the like in the case of textile products other than the yarn, such as garments, and allows also obtaining images portraying transparency in the case of glass products or the like.

BACKGROUND ART

Simulation of knitted products requires images of the yarn making up the knitting stitches or the like. Herein, high-quality yarn images are a must for achieving realistic simulations. For yarn image inputting, the yarn image is input by setting the yarn in a scanner to capture thereby a yarn image in which portions where color and ground color differ are equated to yarn. The yarn image thus captured is used, among other purposes, for simulating a knitted product (Patent Reference 1).

The present inventors have observed that capturing a yarn image using a white background yields a whitish yarn image, whereas capturing a yarn image using a black background yields a blackish yarn image. A likely cause for this is mixing of the background image with the image of the yarn in such translucent portions as yarn fluff and the like, which results in whitish images for white backgrounds, and blackish images for black backgrounds.

Mixing of the background image and the translucent portions of the object image, and the difficulties involved in separating the two, is a problem not only in yarns but also in textile products such as garments and/or glass products. In textile products such as garments, the background image and the textile product image become mixed in fluff portions, mesh holes, and portions where the fabric is very thin, the respective images becoming then difficult to separate. In transparent objects such as glass products or the like, the background image is visible through the glass, becoming difficult to separate from the image of the glass product proper.

Patent Reference 1 WO 03/032203A1

SUMMARY OF THE INVENTION

Object of the Invention

An object of the present invention is allowing to easily create realistic images of objects having fluff and/or transparencies, with high quality.

A secondary object of the invention is to remove the influence of background image unevenness and/or variability over various input operations, to allow creating more realistic image.

A secondary object of the invention is to allow obtaining a realistic image that combines an image of an object with a new background image.

Features of the Invention

The image creation device of the present invention comprises: means for storing input images A, C of an object captured optically at least twice using different background images (G1, G2); means for solving X and D in the system of equations $$A = G1 + (X - G1)D$$

$$C = G2 + (X - G2)D$$

wherein X is a color or monochrome image of the object and D is the opacity thereof; and means for storing the obtained (X,D) as an image of the object.

The image creation method of the present invention comprises the steps of: obtaining input images A, C by optically capturing the image of an object at least twice using different background images (G1, G2); solving X and D in the system of equations $$A = G1 + (X - G1)D \quad (1)$$

$$C = G2 + (X - G2)D \quad (2)$$

wherein X is a color or monochrome image of the object and D is the opacity thereof; and storing the obtained (X,D) as an image of the object.

The image creation program of the present invention comprises: an instruction for storing input images A, C of an object captured optically at least twice using different background images (G1, G2); an instruction for solving X and D in the system of equations $$A = G1 + (X - G1)D \quad (1)$$

$$C = G2 + (X - G2)D \quad (2)$$

wherein X is a color or monochrome image of the object and D is the opacity thereof; and an instruction for storing the obtained (X,D) as an image of the object.

Preferably, the object is yarn, and the obtained (X,D) is stored as a yarn image.

Preferably also, the object is a textile product other than yarn, in particular apparel, and the obtained (X,D) is stored as a textile product image.

Other than the foregoing, the object is preferably a translucent product such as a glass product, a transparent to translucent product such as film, thin paper or the like.

There are preferably further provided means, steps and an instruction for changing the value of D so that, when the possible value of D ranges from 0 to 1, the value of D is set to D=0 when equal to or smaller than a first predetermined value, to D=1 when equal to or greater than a second predetermined value, and to 0 to 1 when the value of D is between the first predetermined value and the second predetermined value.

The system of equations of (1) and (2) may be solved exactly or approximately. Image input is easy when the background images are for instance a white background image and a black background image. Scanners, digital cameras or the like used for obtaining the input images of the object may be a part of the image creation device, or may be removed from the image creation device.

Preferably, a composite image K is obtained through $$K = XD + F(1-D)$$

by inputting a new background image F.

Advantages of the Invention

As illustrated in FIGS. 5, 6 or the like, the image creation device, image creation method and image creation program of the present invention allow creating high-quality and accurate images in a simple way.

The image of the object itself and the image of the background do not mix with each other in the created images, even in high-transparency portions such as yarn fluff, mesh holes, glass products or the like, which prevents images from becoming whitish or blackish on account of the background. The following effects are achieved as a result.

(1) Images can be portrayed with the hue and texture of the object being rendered realistically and with a three-dimensional effect. Details of the object such as fluff or the like, in particular, can be finely portrayed since they are prevented from becoming whitish or blackish.

(2) No white streaks appear on contours even when an image created against a white background is combined with a black background. Similarly, no black streaks appear on contours even when an image created against a black background is combined with a white background.

In the case of yarn images, simulation of knitted fabrics or the like using created images yields a naturalistic representation of fluff or the like, and the hues thereof, which allows portraying knitted fabrics or the like with three-dimensional effect and in correct hues.

Images can be created simply, for instance by inputting twice an image changing the background image. For creating the images, furthermore, it is not necessary herein to manually adjust an opacity image using a stencil or the like, as in conventional cases.

Also, background image fluctuation, variability over various input operations, variability in the inputting means such as a scanner or the like, light scattered by the object itself, stray light leaking through gaps between cover and original plate glass, among other influences, can be avoided by setting opacity to 0 for portions in which opacity is equal to or smaller than a first predetermined value, to 1 for portions in which opacity is equal to or greater than a second predetermined value, and by expanding the dynamic range of opacity for values between these predetermined values.

DESCRIPTION OF THE REFERENCE NUMERALS

Figure 1:
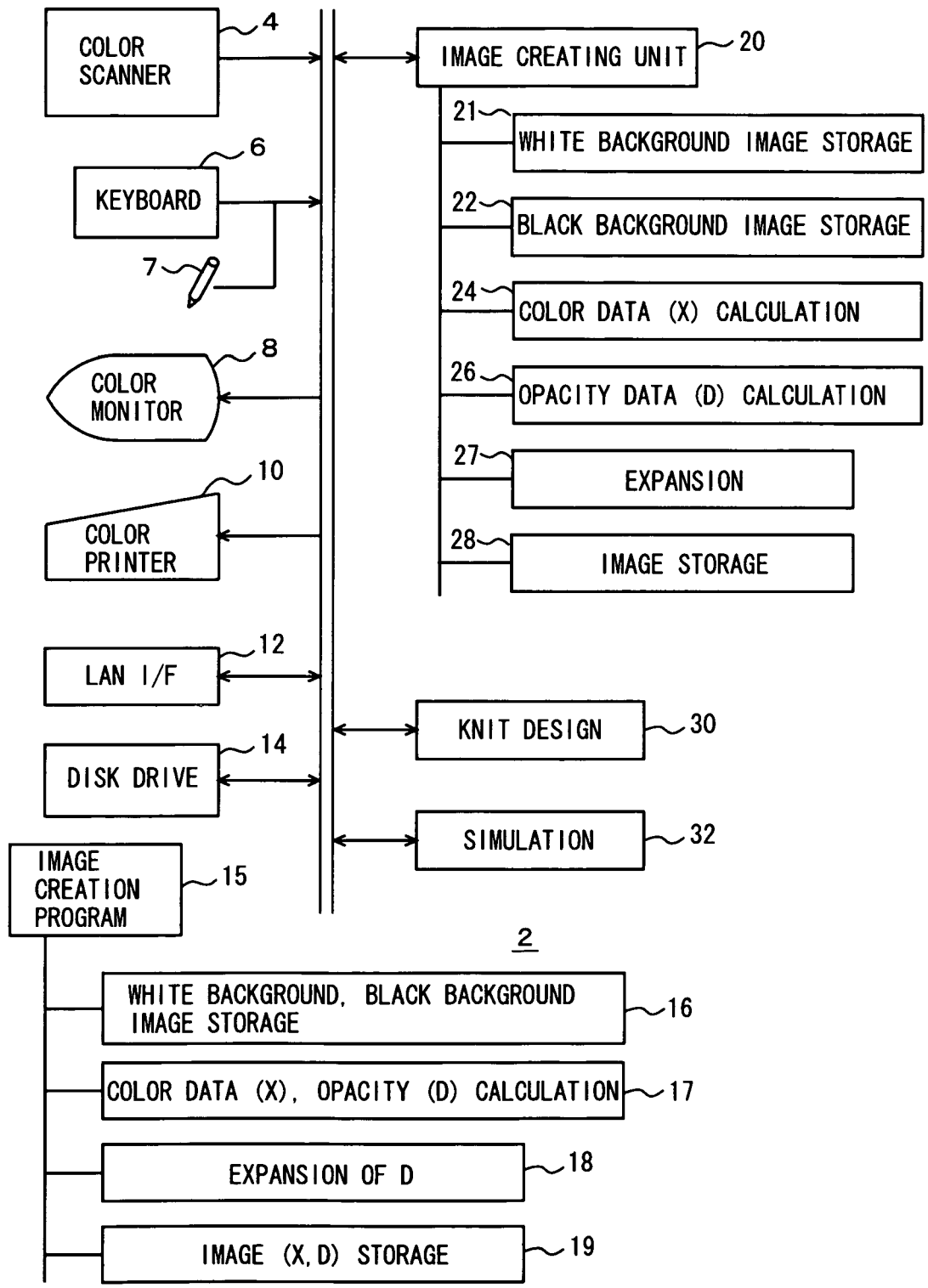
FIG. 1 is a block diagram of a simulation device comprising a yarn image creation unit in an embodiment.

2 Simulation device
4 Color scanner
6 Keyboard
7 Stylus
8 Color monitor
10 Color printer
12 LAN interface
14 Disk drive
15 Image creation program
16 Input image storage instruction
17 Color data, opacity storage instruction
18 Opacity expansion instruction
19 Image storage instruction
20 Image creating unit
21 White background image storing unit
22 Black background image storing unit
24 Color data calculating unit
26 Opacity calculating unit
27 Expansion unit
28 Image storing unit
30 Knit design unit
32 Simulation unit
51 Yarn image created in an embodiment
52 Display of a yarn image against a black background
53 Display of a yarn image against a white background
54 Simulation image of a knitted fabric using a yarn image created in an embodiment
55 Yarn image created using a white background in a comparative example
56 Display of a yarn image against a black background
57 Display of a yarn image against a white background
58 Simulated image of a knitted fabric using a yarn image created in a comparative example
61 Display against a black background of a yarn image created in an embodiment
62 Display against a white background of a yarn image created in an embodiment
63 Simulated image of a knitted fabric using a yarn image created in an embodiment
71 Display against a black background of a yarn image created using a white background in a comparative example
72 Display against a white background of a yarn image created using a white background in a comparative example 73 Simulated image of a knitted fabric using a yarn image created in a comparative example

EMBODIMENTS

Preferred embodiments for carrying out the invention are explained next.

Figure 5:
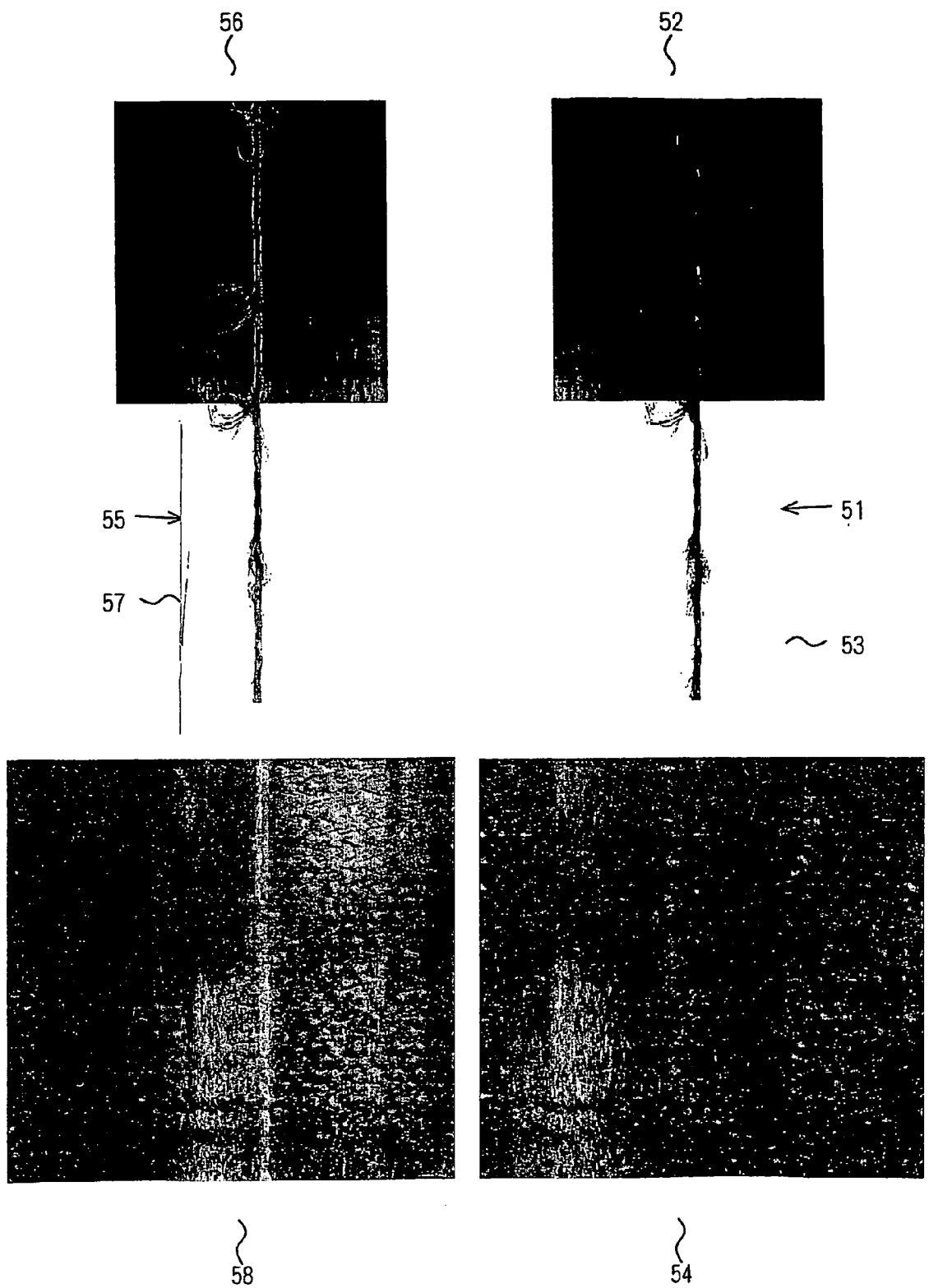
FIG. 5 illustrates a simulated image of a knitted fabric using a yarn image created in the embodiment, and a simulated image of a knitted fabric using a yarn image created in a comparative example.
Figure 6:
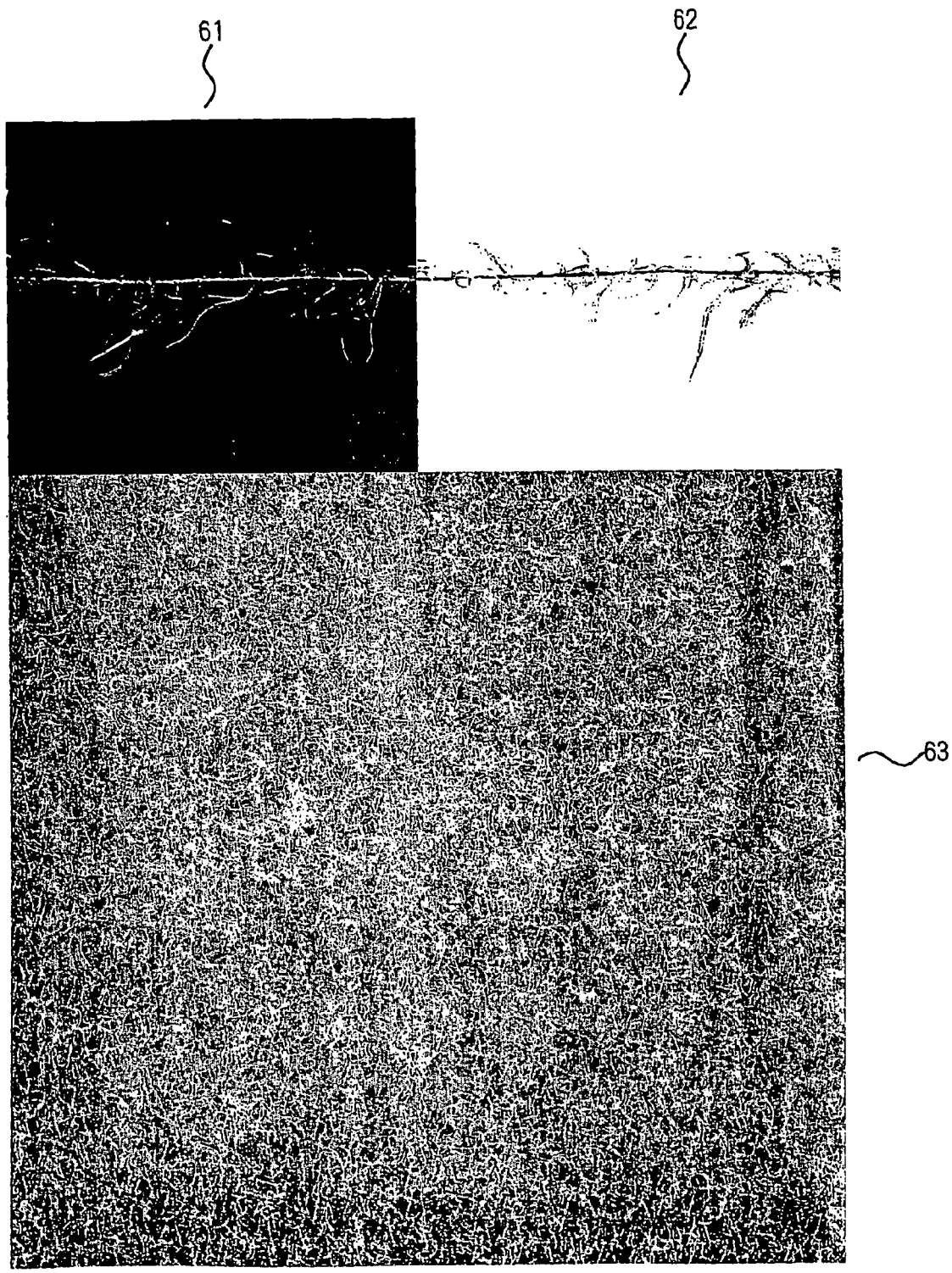
FIG. 6 illustrates another yarn image created in the embodiment, and a simulated image of a knitted fabric using that yarn image.
Figure 7:
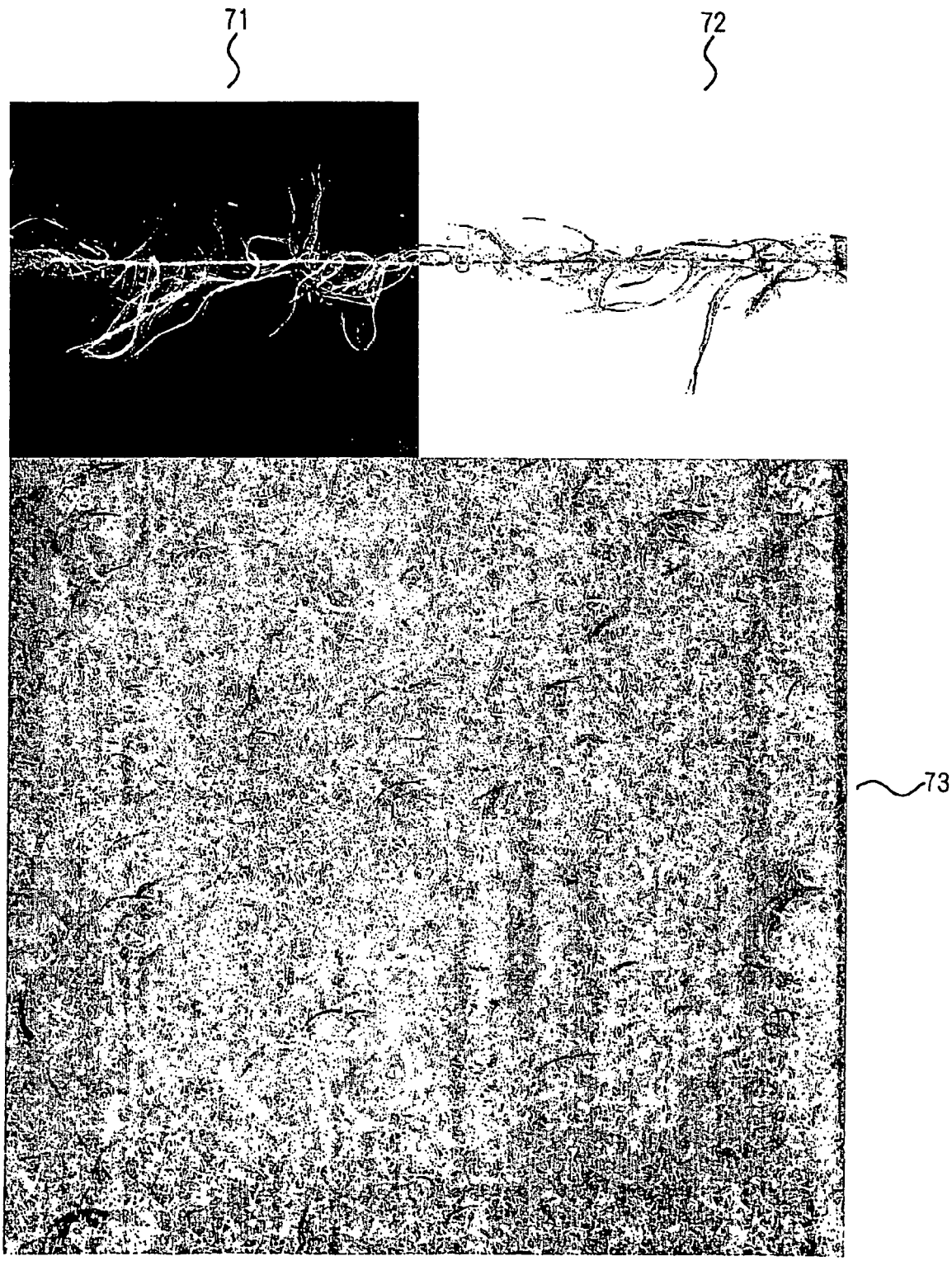
FIG. 7 illustrates another yarn image created in the comparative example, and a simulated image of a knitted fabric using that yarn image.
Figure 8:
FIG. 8 illustrates an image of a garment created in a second embodiment, combined with two backgrounds, a white one and a black one.

FIG. 1 to FIG. 6 illustrate a first embodiment of the creation of a yarn image, and FIG. 7 illustrates a yarn image obtained in a comparative example, for reference. FIG. 1 illustrates a simulation device 2 using an image creation device of the embodiment, wherein 4 may be a color scanner, a digital camera or a monochrome scanner for image input. The reference numeral 6 denotes a keyboard and 7 denotes a stylus, which can be replaced by suitable input means such as a mouse, a trackball or the like. The reference numeral 8 denotes a color monitor on which are displayed the obtained yarn images, the created knit design data or simulated images of knitted fabrics, or garments from the design data. Similarly, the yarn images, knit design data, simulated images and the like are output via a color printer 10.

The simulation device 2, which is connected to a LAN via a LAN interface 12, inputs and outputs yarn images, knit design data or simulated images or the like, and similarly, inputs and outputs yarn images, knit design data or simulated images via a disk drive 14. Instead of being obtained by means of a color scanner 4, yarn input images may be captured by a remote scanner and be input through the LAN interface 12, the disk drive 14 or the like.

The reference numeral 15 denotes an image creation program read by the simulation device 2 through the disk drive 14, the LAN interface 12 or the like, for creating yarn images or the like. The image creation program 15 comprises a storage instruction 16 for storing yarn input images for two different background images such as black and white; a storage instruction 17 for storing yarn color data X and opacity D; and an expansion instruction 18 for expanding the opacity D; as well as a storage instruction 19 for storing the created images (X,D) of the yarn or the like. The image creation program 15 is explained in detail below with reference to the flowchart of FIG. 3. The background image may be referred to simply as background, and the yarn color image may be referred to as color data.

The image creating unit 20 for yarn or the like is provided as a part of the simulation device 2, but the image creating unit 20 may also be provided as an independent image creation device in combination with the color scanner 4 or the like. The reference numeral 21 denotes a white background image storing unit for storing input images of yarns against a white background, for instance by closing the cover of the color scanner 4. The black background image storing unit 22 stores input images of yarns against a black background, for instance by opening the cover of the color scanner 4. Two images are stored herein, against a white and a black background, but the images may also be stored against any two different backgrounds.

The color data calculating unit 24 calculates the color value X of the yarn images, and the opacity calculating unit 26 calculates the opacity D of the yarn images. The expansion unit 27, for instance for an opacity D ranging from 0 to 1, converts to 0 a value of D equal to or lower than a first predetermined value, converts to 1 a value of D equal to or higher than a second predetermined value, and converts to 0 to 1 a value of D between a first predetermined value and a second predetermined value, thereby expanding the dynamic range of D. The expansion unit 27 may optionally be omitted.

The image storing unit 28 reads the color data X and opacity D (expanded) thus created and stores them retrievably.

In the present embodiment the color data X are handled employing a RGB system, but may also be handled using an HVC system, Lab system or the like; also since the opacity D is determined for each RGB component, the average value thereof for instance is treated as the opacity D. In HVC the value V represents color lightness, and hence the opacity D may also be calculated using the value V if HVC is employed.

In the knit design unit 30, knit products are designed using the color scanner 4, keyboard 6, stylus 7 or the like, then the designed data are converted into knitting data for a flat knitting machine. The simulation unit 32 converts into simulated images the design data of a knitted fabric or garment determined by the knit design unit 30, and portrays the texture and three-dimensional effect of the garment by distinctly representing the yarn image. The knit design unit 30 and the simulation unit 32 are known in the art, for instance as disclosed in Patent reference 1.

Figure 2:
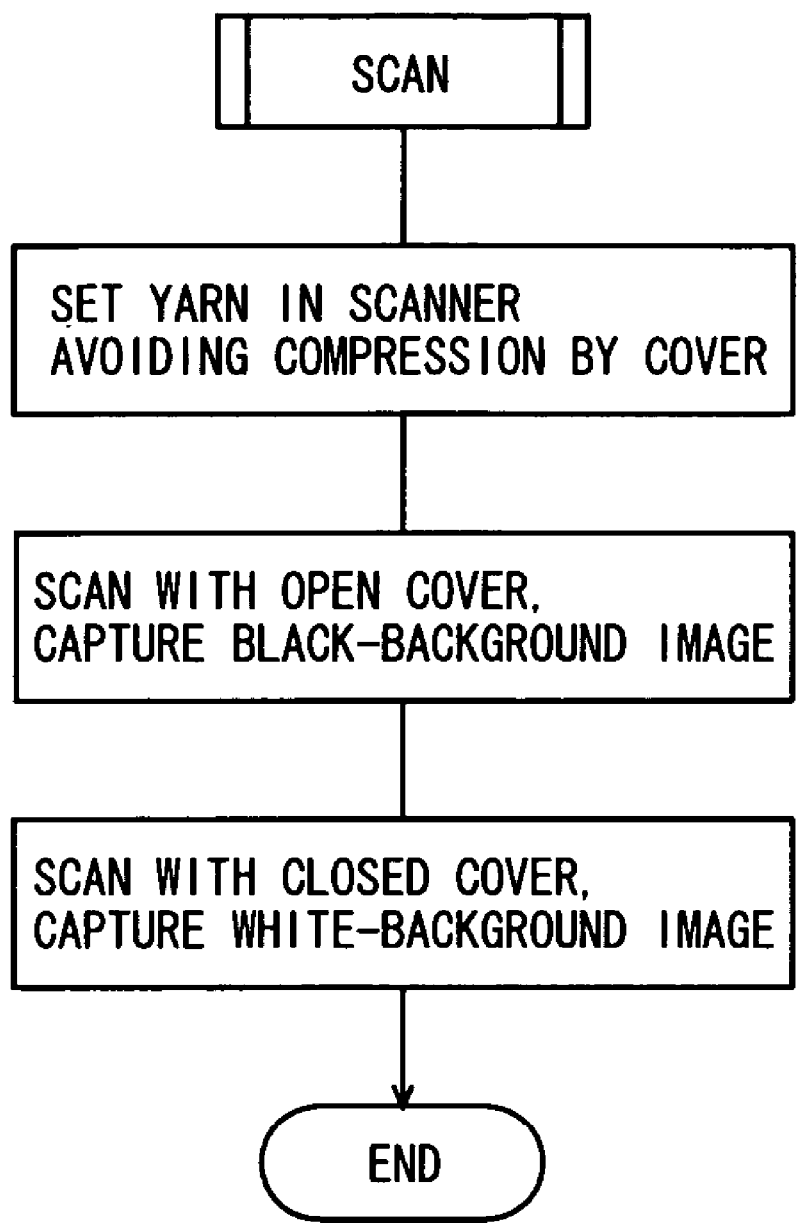
FIG. 2 is a flowchart illustrating the input process of a yarn image in the embodiment.

FIG. 2 illustrates yarn image inputting using a color scanner. The yarn is set on the original glass plate or the like of the scanner and is pressed with the cover, without wholly closing the latter to avoid crushing the fluff. The cover is then opened and the yarn is scanned to obtain a black background image. Similarly, the cover is closed and the yarn is scanned to obtain a white background image. Since the two input images, black background and white background, are used later on superposed onto each other, the yarn should not move during the time intervening between two image inputs. An image capture range should preferably be specified for the scanner, since the periphery of the fluff is the only other required image.

Figure 3:
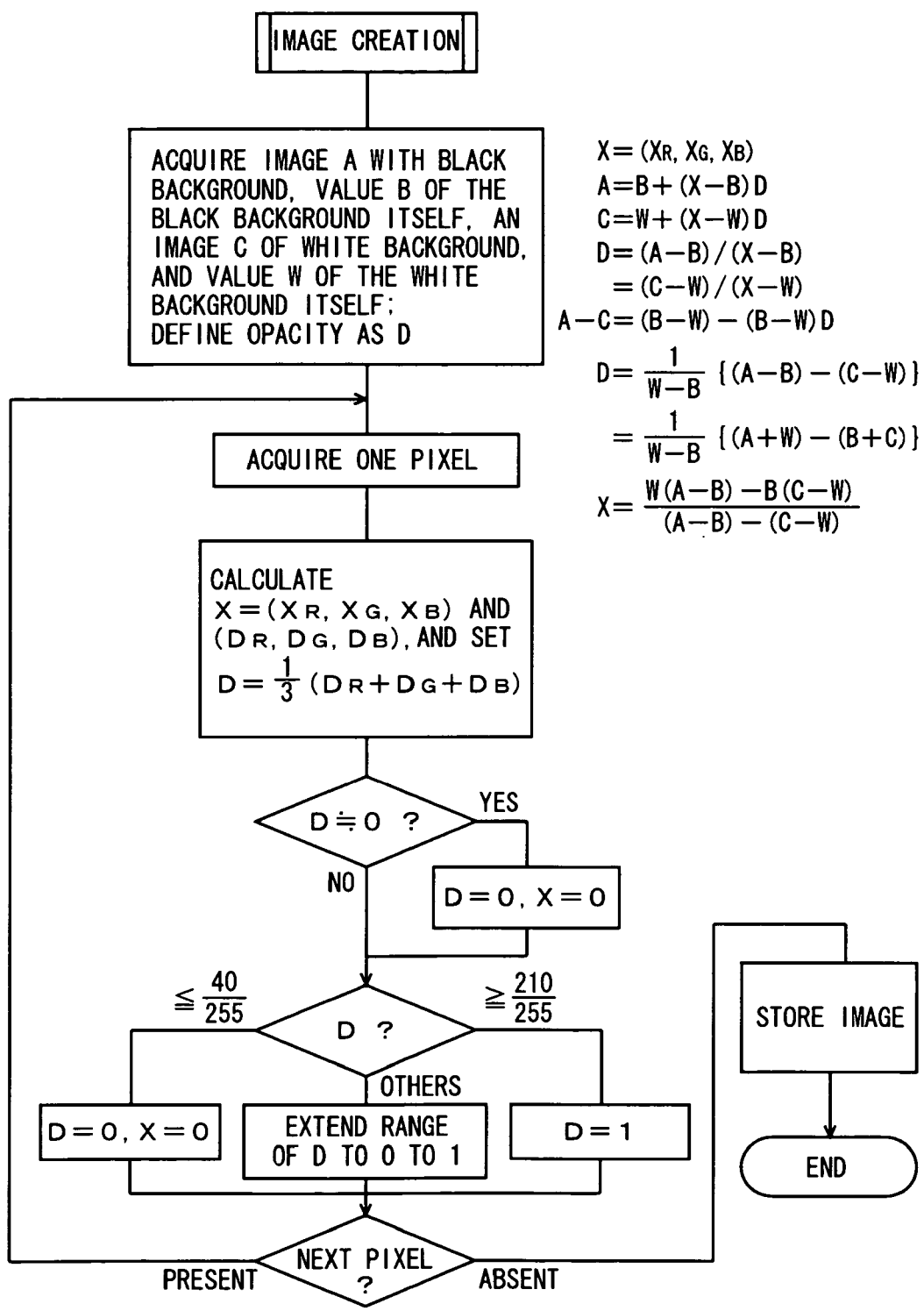
FIG. 3 is a flowchart illustrating an algorithm for creating a yarn image in the embodiment.

FIG. 3 illustrates an algorithm for creating images of yarns or the like. An input image A with a black background is read from a black background image storing unit, and an input image C with a white background is read from a white background image storing unit. B is the value of the black image of the background and W is the value of the white image of the background. As explained above, A, B, C and W are RGB images and exhibit therefore a 256-gradation of 0 to 255 shades. Further D is the opacity, and D is for a monochrome image and has 256 halftones.

The relationship between the black background image A, the value B of the black background image, and the color image X and opacity D of the yarn, is given by A=B+(X−B)D. Similarly, the relationship between the white background image C, the value W of the white background image, the color image X and opacity D of the yarn, is given by C=W+(X−W)D. X and D can be determined from these two equations. For instance, $$D=(A-B)/(X-B)=(C-W)/(X-W) \quad (3)$$

allows expressing D based on X. Alternatively, by determining the difference between A and C we obtain $$A-C=(B-W)-(B-W)D \quad (4)$$

from which D can be solved as $$D=\{(A+W)-(B+C)\}/(W-B) \quad (5)$$

X can be determined from $$X=\{W(A-B)-B(C-W)\}/\{(A-B)-(C-W)\} \quad (6)$$

The method used for solving the system of first-degree equations to determine D and X may be any arbitrary method; herein, an exact numerical solution of the equations is not mandatory, an approximate solution thereof being also acceptable.

The input image is processed next, for instance sequentially pixel by pixel, to determine the values of X and D. One pixel is acquired, the X value and D value thereof are determined as described above, and the process is repeated until completion for all pixels. The color data X above are RGB data, and therefore the opacity D has also a value DR obtained using an R image, a value DG obtained using a G image, and a value DB using a B image; herein, however, though the color data X has 3 components XR, XG and XB, the opacity D is taken as the average of the DR, DG and DB. For averaging can be used an arithmetic mean, a geometric mean or a median, instead of a mean.

When the value of D is substantially 0, i.e. when the value of A+W and the value of B+C are substantially identical, it may be assumed that what appears is the background image and that there is no yarn for the pixel in question. When the value of D is substantially 0, therefore, both D and X are set to 0. When the value of D is not substantially 0, the value of D ranges from 0 to 1; for instance when D is equal to or less than 40/255, both D and X are set to 0. When D is equal to or higher than 210/255, D is set to 1 and the value of X remains unchanged. When the value of D is 40/255 to 210/255, D is expanded to range from 0 to 1. All the pixels of the input image are processed in this way to store a yarn image (X,D).

In the processing for determining the color data X and/or the opacity D from the input image A, C, the denominator of the color data X is determined first for instance through equation (6), so that when that value is substantially 0, the opacity D and/or the color data X may be equated to 0, and D and X may be determined for regions where D is not 0. Alternatively, the opacity D may be determined first using equation (5), after which the color data X is determined using equation (6). Whether to determine D and X for each pixel, or to determine first the opacity D for the whole image followed by determination of X, is a matter of arbitrary design.

Figure 4:
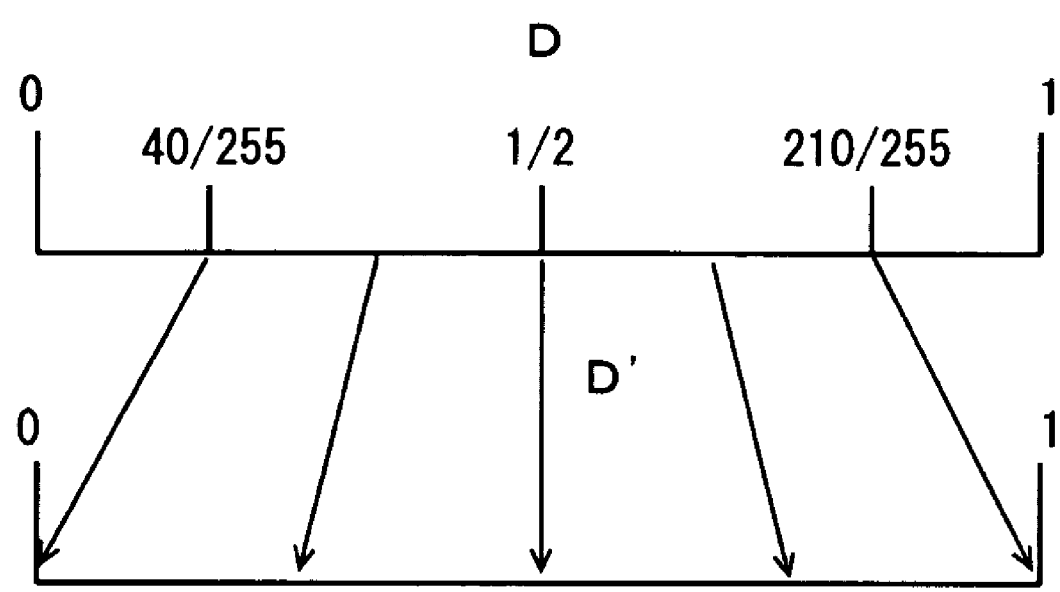
FIG. 4 is a diagram illustrating opacity expansion processing in the embodiment.

FIG. 4 illustrates expansion of the opacity D; herein, the value of D is set to 0 when equal to or lower than a first predetermined value, for instance 40/255. The value of D is set to 1 when equal to or higher than a second predetermined value, for instance 210/255. The dynamic range of D is expanded so that the remaining values of D, 40/255 to 210/255, may range from 0 to 1. FIG. 4 shows the value D' after expansion.

A value of D equal to or lower than 40/255 corresponds to high transparency, which is likelier to be the result of background image unevenness, image inputting variability over various input operations, influence of light scattered by yarn on the scanner or the like, than the result of there being no yarn for the pixel in question. Therefore, the value of D is set to 0 when equal to or lower than 40/255. A value of D equal to 210/255 or higher is presumably the result of image input disturbances, such as image input variability, or of the scanner cover being closed leaving a small gap between cover and glass plate upon attempting to prevent yarn compression. Similarly, thus, the value of D is set to 1 when equal to or higher than 210/255.

For comparison purposes, a yarn image is created using a white background image only. For creating the yarn image of the comparative example, the background image is equated to a white single color, an opacity D mask is provided, such that the portions where the values of the input image change from the values of the background are taken as yarn images, and the color image X of the yarn is cut out. When the opacity D approaches 0, the values of the color data X approach the background image, while when the opacity D approaches 1, the difference between the color data X and the background image increases. In this algorithm a realistic yarn image could not be obtained, and hence a stencil was used to manually retouch the opacity image with a view of obtaining a yarn image as realistic as possible.

FIG. 5 illustrates a created yarn image. The reference numeral 51 in the right denotes a yarn image created in the embodiment, 52 denotes this yarn image displayed against a black background, and 53 is the same displayed against a white background. The reference numeral 54 denotes a simulated image of a knitted fabric using the yarn image created in the embodiment. In the left half of FIG. 5 is displayed a yarn image 55 of a comparative example, which was created as described above using a white background. The reference numeral 56 is the yarn image of the comparative example combined with and displayed against a black background, whereas 57 is the yarn image of the comparative example displayed against a white background. The reference numeral 58 denotes a simulated image of a knitted fabric using the yarn image of the comparative example. The yarn image 51 and yarn image 55 were input on the same position and using the same yarn.

A comparison of the yarn image 51 and the yarn image 55 shows that more fluff is displayed in the yarn image of the embodiment, while the yarn image of the Comparative example is a more whitish image. Visual examination of the portions where the background was black reveals white-streaked portions, visible on the sides of the yarn of the Comparative example, and caused by white background being taken as the yarn image through mixing of the white background color with the color data of the fluff of the yarn. By contrast, the yarn image 51 of the embodiment is a realistic, true-to-life image rich in fluff, whether observed against a black background or a white background. A comparison between the simulated images 54 and 58 reveals that the image 54 using the yarn image of the embodiment has plenty of fluff and portrays the three-dimensional effect of the knitted fabric. In the image 58 of the Comparative example, by contrast, the knitted fabric appears lifeless and elicits a thin, flat feeling.

FIG. 6 illustrates a yarn image created according to the embodiment, using another yarn, 61 being the yarn image displayed against a black background and 62 being the yarn image displayed against a white background, and illustrates a simulated image 63 using the yarn image. For reference, FIG. 7 illustrates a yarn image created according to the Comparative example, using a white background, and a simulated image 73 using this yarn image. The reference numeral 71 denotes the yarn image created according to the comparative example (created with a white background) displayed against a black background, and the reference numeral 72 denotes the same displayed against a white background. The yarn image in the comparative example appears whitish overall, and portrays fluff thicker than it actually is. Upon comparison of the simulated image 63 with the simulated image 73, a fine fluff coupled with a three-dimensional effect is portrayed in the embodiment, whereas the simulated image 73 of the comparative example portrays a fluff thicker than it actually is, with a rendering lacking in three-dimensional effect.

The embodiment affords the following effects.

(1) A yarn image can be easily created by capturing twice a yarn image at the same position, using two backgrounds, a white background and a black background.

(2) In the created yarn image, the color data and opacity of the yarn are rendered realistically, the yarn main body and fluff being portrayed with high quality.

(3) The hue of fluff portions and/or the whole image can be realistically portrayed upon creation of simulated images of knitted fabrics or the like using the obtained yarn image, which allows accurately portraying the texture of the knitted fabric.

Embodiment 2

In the above embodiment was described the creation of a yarn image, but the present invention can be used as well for creating images of textile products such as garments, or of transparent objects such as glass products or the like. The problem in the case of yarn images was to differentiate and separate fluff and background. Since fluff portions are translucent, an additional problem was to avoid mixing of the background with the excised fluff image. In other textile products as well it is important to automatically cut out portions that are difficult to excise from the background, such as fluff or the like, and to remove the background image from the image of the object in translucent portions. Textile products include, besides apparel, curtains, blankets, table covers, cushions or the like. In addition to textile products, moreover, the present invention can also be used for creating images having transparencies such as images of glass products, films, thin paper or the like. The present invention allows obtaining the opacity D and an image X of the object itself separated from the background. The composite image K is given by $$K=XD+F(1-D)=F+(X-F)D \qquad (7)$$

wherein X is the image of the object, F is the background image to be combined with the object, and D is the opacity of the object image. Two kinds of background are preferably used, more preferably solid backgrounds. Background portions are preferably input for instance manually in order to input which portions in the captured image are background and which portions correspond to the object.

Capturing images with changing backgrounds using a scanner is difficult in garment-wearing mannequins, furniture, household implements, glass products or the like; thus, such images are photographed with a digital camera in which the background is changed to white and black. Compared with using a scanner, interior photography using a digital camera, which cannot match the excellent photographic environment of a studio or the like, is prone to suffer from background unevenness, and hence it is preferable, during the opacity extension processing, to expand the range of D=0 and/or D=1 somewhat wider than is the case in FIG. 4.

Figure 9:
FIG. 9 illustrates an image of a garment created in a conventional embodiment, combined with two backgrounds, a white one and a black one.
Figure 10:
FIG. 10 illustrates a white background image used for creating the image of FIG. 8.
Figure 11:
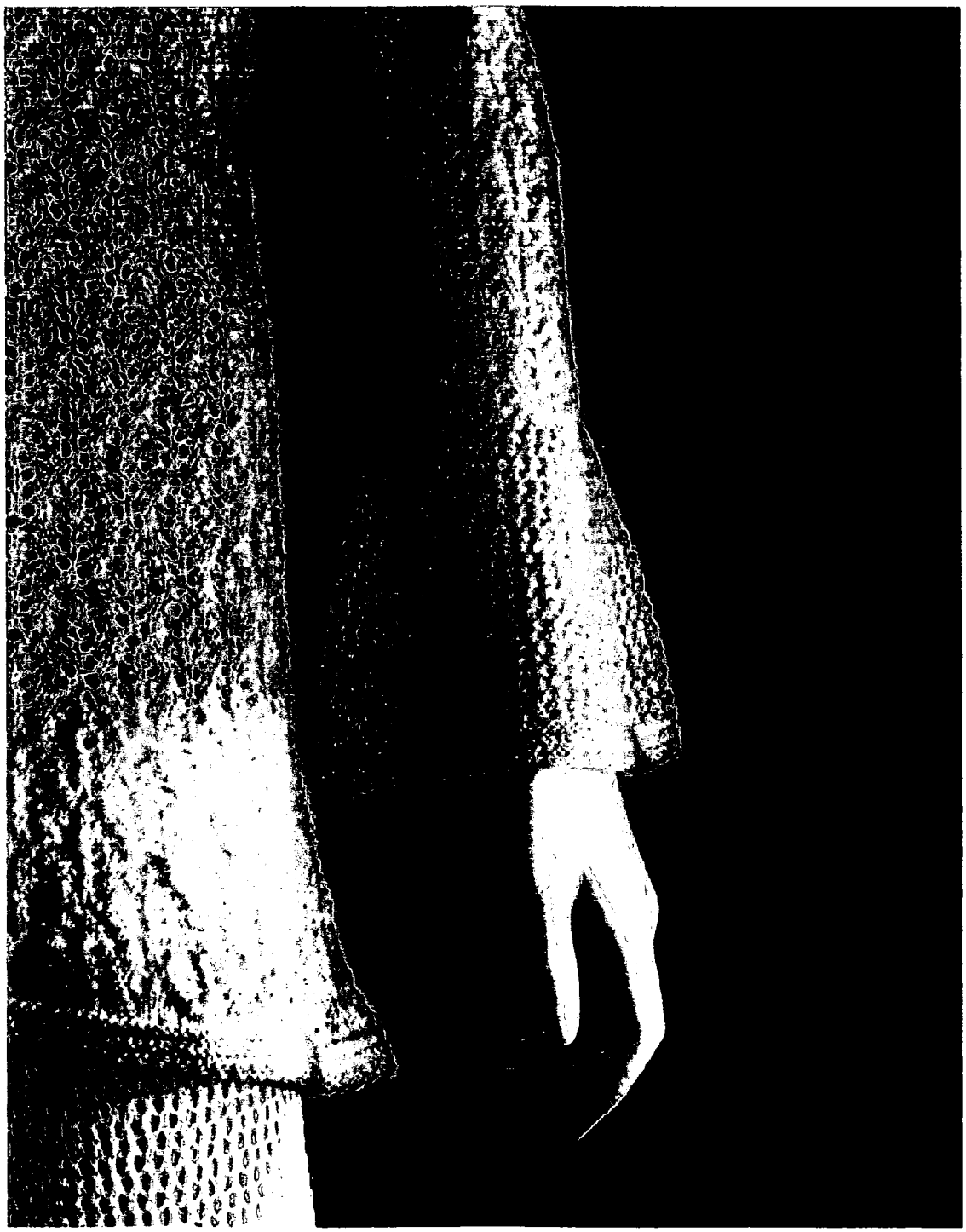
FIG. 11 illustrates a black background image used for creating the image of FIG. 8.

FIGS. 8 to 11 illustrate an embodiment relating to images of mesh-type knitwear worn by a mannequin. FIGS. 10 and 11 are images taken with a digital camera, against a white or black background. FIG. 9 is a composite image with a white or black background, through manual creation of a stencil from FIG. 11 and cutting out of the garment image. In the conventional embodiment of FIG. 9 fluff appears unnaturally black against the white background. This stems from the difficulty of cutting out only the pixels corresponding to the fluff, and from opacity ambiguity, which causes the black background image to become mixed with the pixels of the cut out fluff. By contrast, the embodiment in FIG. 8 affords an image with fluff rendered naturally, both against a white and a black background.

The image creation device and/or image creation program of FIG. 1 can be used as is for images other than yarn, for which the algorithm of FIG. 3 can also be used without modification as an image creation algorithm. As explained above, images can be captured using digital cameras or the like, instead of by image scanning as in FIG. 2. The description relating to the embodiment of FIG. 1 to FIG. 7 applies to Embodiment 2 and Embodiment 3.

Figure 12:
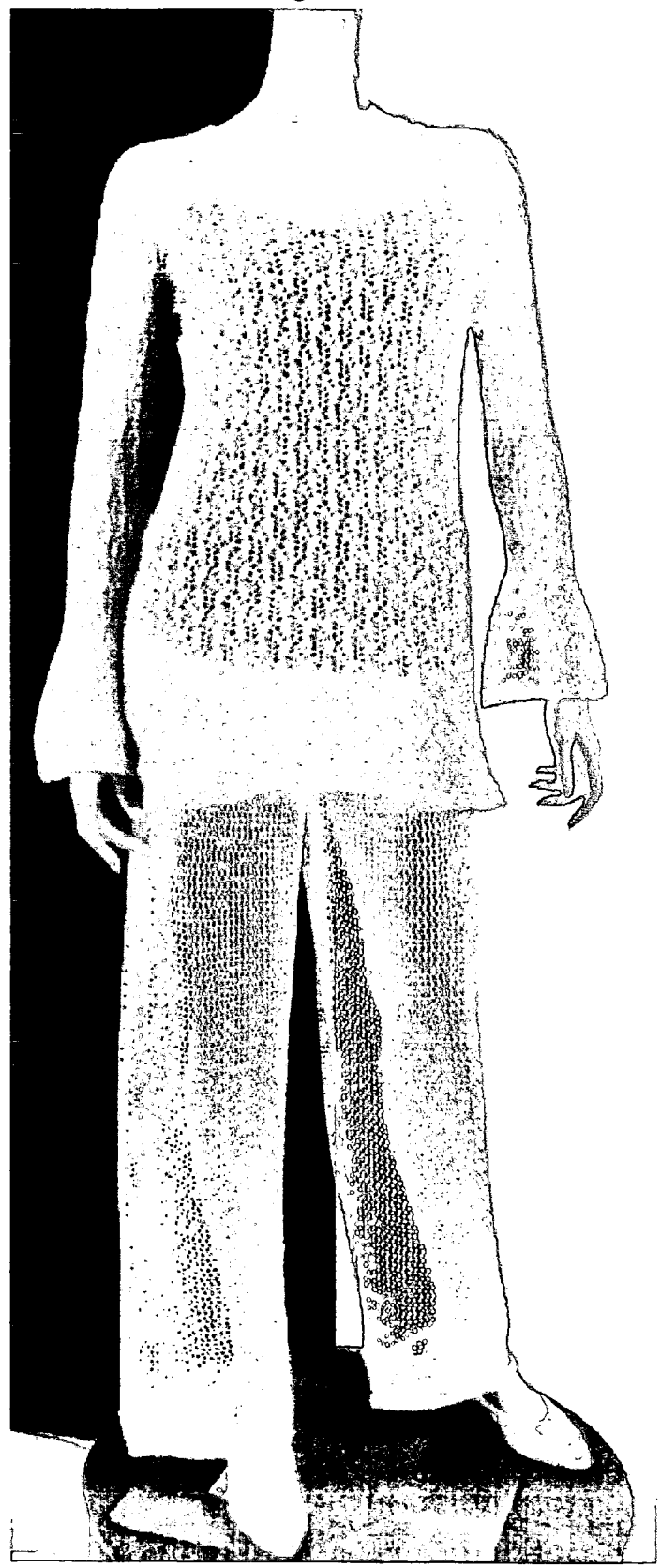
FIG. 12 illustrates an image of a whole-body garment created in the second embodiment, combined with two backgrounds, a white one and a black one.
Figure 13:
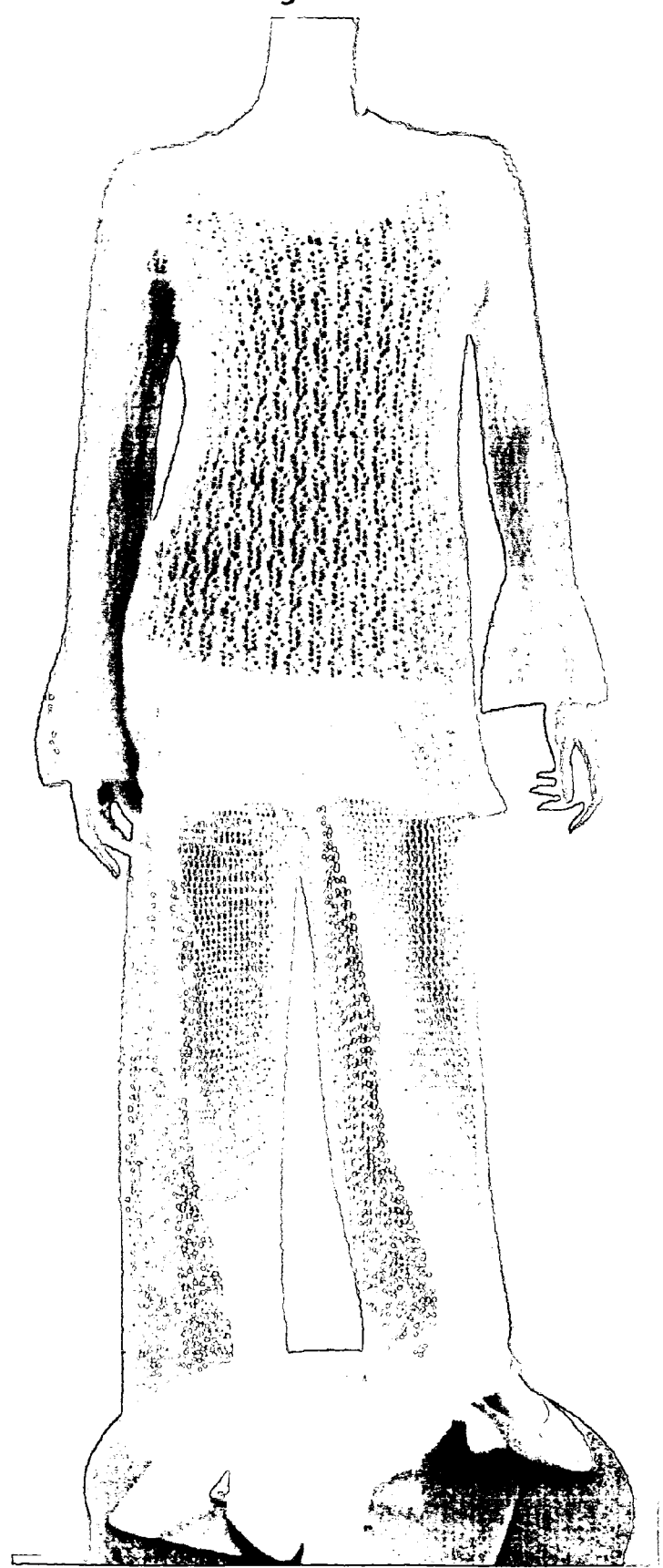
FIG. 13 illustrates a white background image used for creating the image of FIG. 12.
Figure 14:
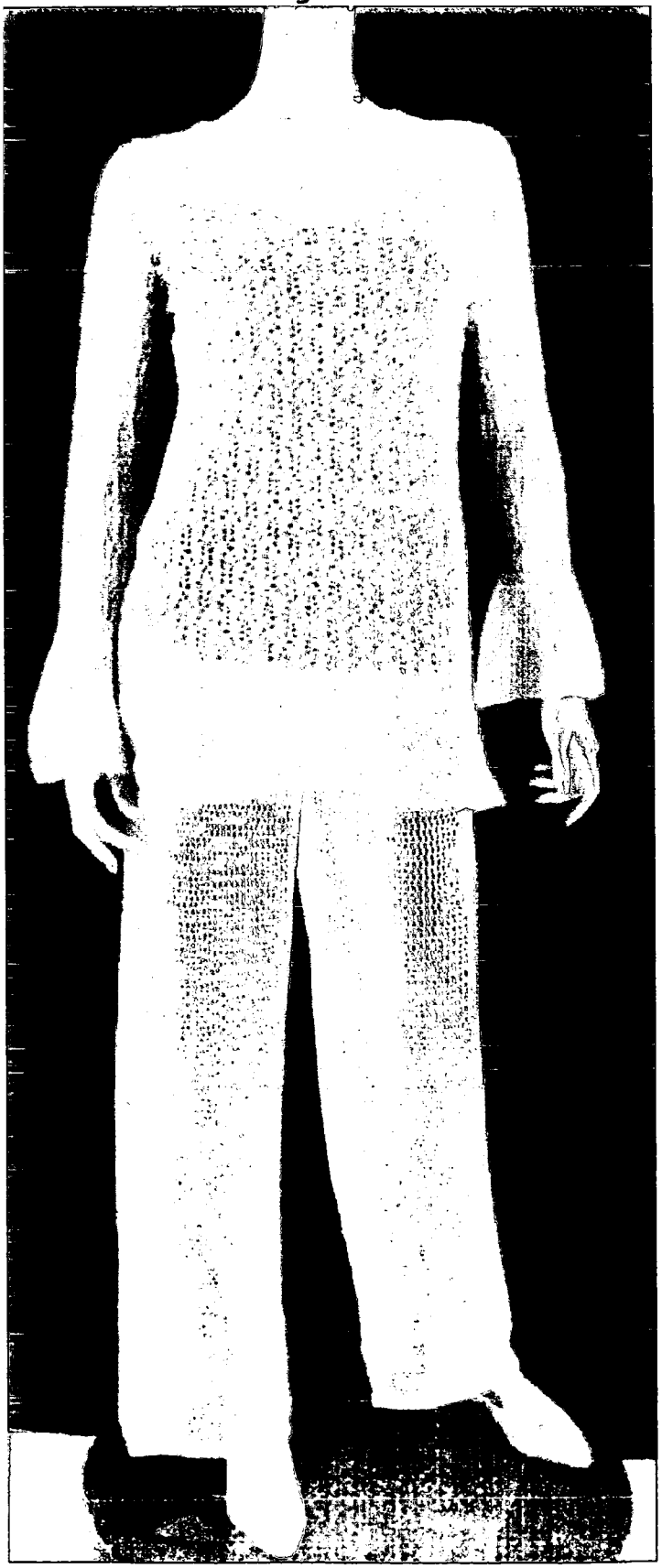
FIG. 14 illustrates a black background image used for creating the image of FIG. 12.

FIGS. 12 to 14 are images of a mannequin wearing the same garment. FIG. 13 and FIG. 14 correspond to images captured with a digital camera against a white or black background; FIG. 12 is an image created based on the embodiments, and synthesized against a white or black background using respectively the images of FIG. 13 and FIG. 14. FIG. 12 portrays the mesh of the sleeves and pants, which have transparencies. In the unmodified images of FIGS. 13 and 14, by contrast, it is difficult to separate the portions having mesh holes from the image of the garment itself and from the images of the background. Changing the background results thus in an unnatural image.

Embodiment 3

Figure 15:
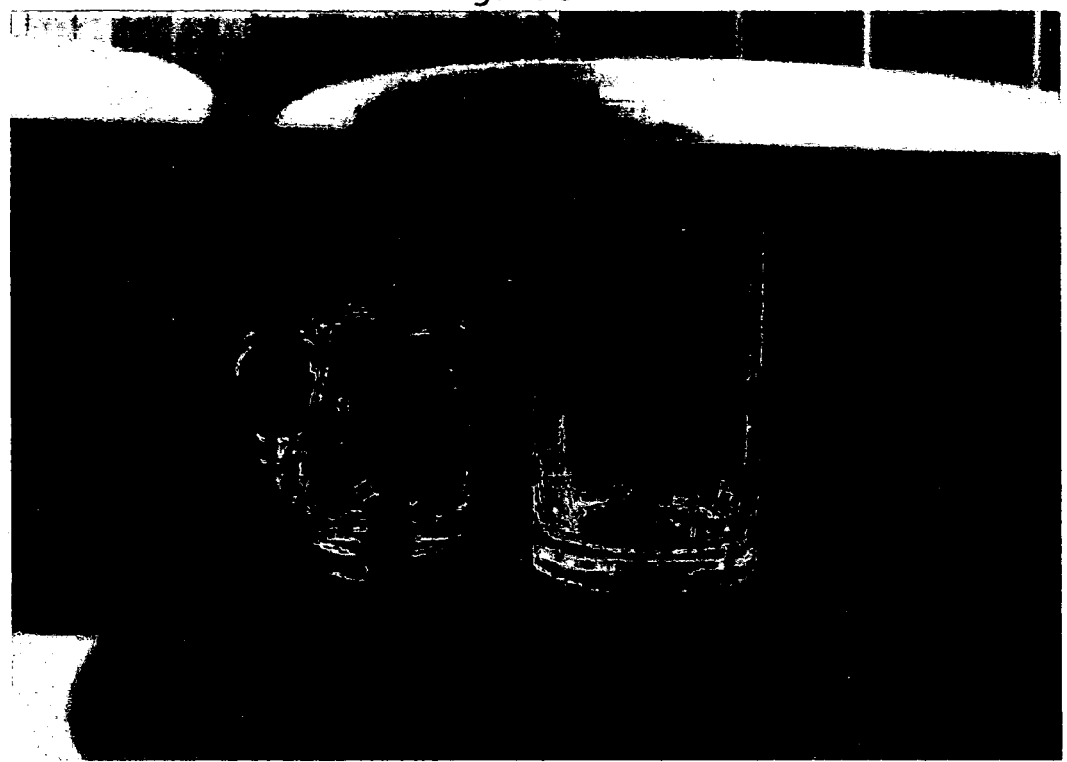
FIG. 15 illustrates an image of two glasses created in a third embodiment, combined with a background image.
Figure 16:
FIG. 16 illustrates an image of two glasses created in the third embodiment, combined with two backgrounds, a white one and a black one.
Figure 17:
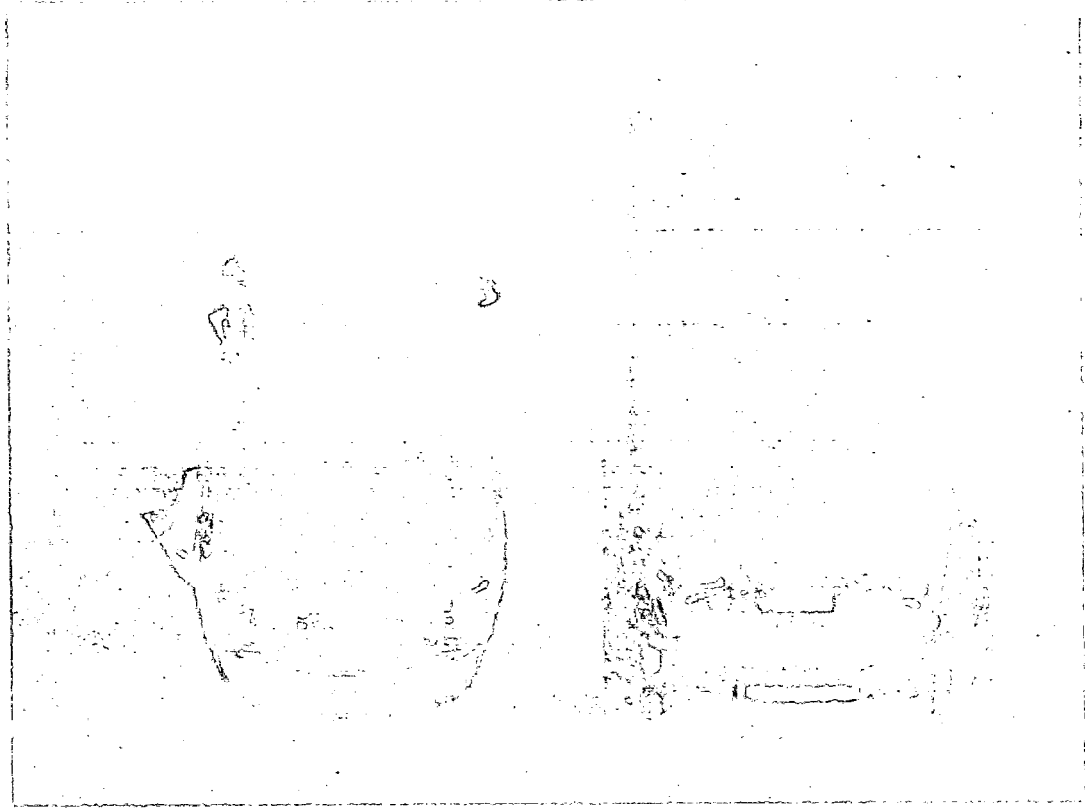
FIG. 17 illustrates a white background image used for creating the images of FIG. 15 and FIG. 16.
Figure 18:
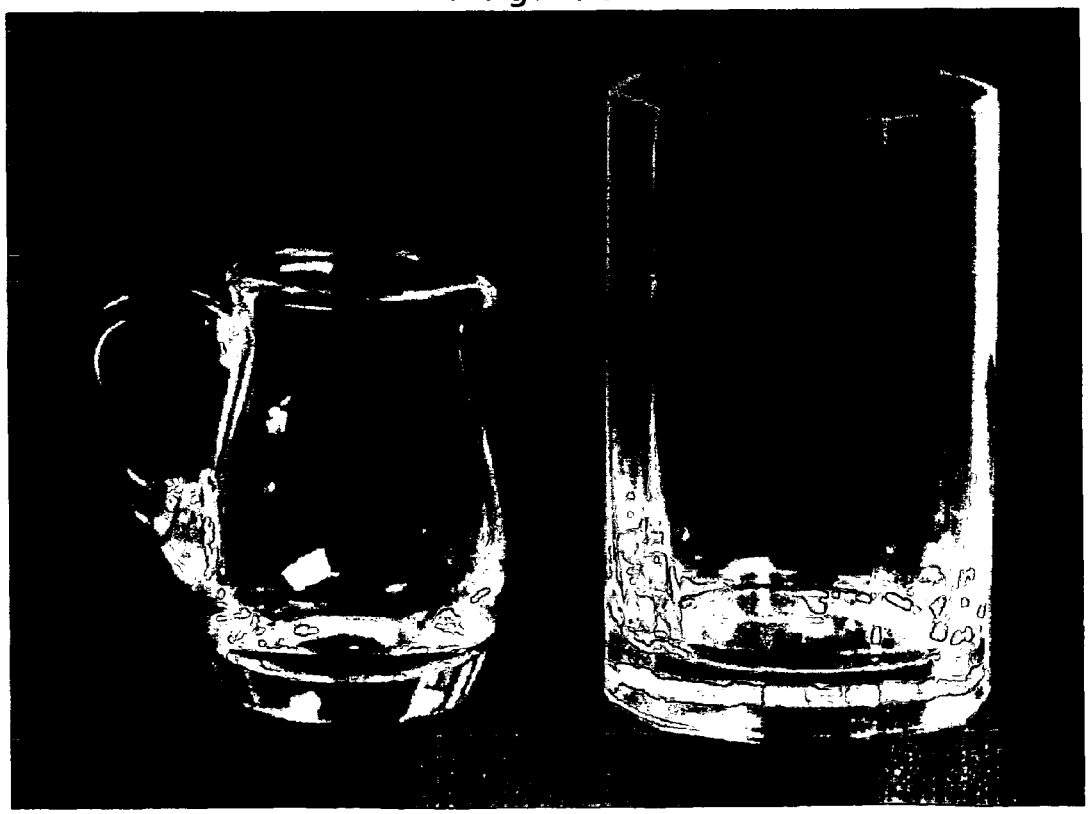
FIG. 18 illustrates a black background image used for creating the image of FIG. 15 and FIG. 16.

FIGS. 15 to 18 illustrate a third embodiment relating to images of a glass product. FIG. 17 and FIG. 18 illustrate images of a glass and a jug taken with a digital camera, against a white and a black background. FIG. 15 illustrates a composite image resulting from combining a glass-product image X and an opacity D image thereof, obtained from the above glass and jug by application of the embodiment, with a background image of a table and an ashtray, and with a white and black background image, in FIG. 16. Since an opacity D image is obtained, the resulting image looks natural even when backgrounds change (FIG. 16), and even against non-uniform backgrounds such as the background of FIG. 15, which contains an ashtray; surface gloss, moreover, is portrayed in line with transparency (FIG. 15, FIG. 16).

The invention claimed is:

1. A yarn image creation method for creating a color image of yarn having translucent fluff, comprising the steps of:
   storing, on a computer-readable medium, color input images A, C of the yarn captured optically at least twice using different background images (G1, G2); solving X and D in the system of equations $$A=G1+(X-G1)D$$

$$C=G2+(X-G2)D$$

wherein X is a color image of the yarn itself and D is a yarn opacity image;
   changing the value of D to 0 for pixels in which the value of D is not greater than a first predetermined value, and to 1 for pixels in which the value of D is not smaller than a second predetermined value, the yarn opacity image D being 1 in pixels where the yarn is totally opaque, and being 0 in pixels where the yarn is totally transparent; and
   storing the obtained color image X of the yarn itself and the yarn opacity image D as a yarn color image (X,D) on a computer-readable medium.

2. The yarn image creation method of claim 1, wherein for capturing the color input image of the yarn, the yarn is set in a color scanner provided with a cover, the color input image A of the yarn is captured with the cover open, and the color input image C of the yarn is captured with the cover closed.

3. The yarn image creation method of claim 2, wherein the yarn is set in said color scanner in such a way that the yarn is not compressed by the cover.

4. The yarn image creation method of claim 1, wherein the obtained yarn color image (X,D) is used for creating a simulated image of a textile product using the yarn.

5. A yarn image creation device for creating a color image of yarn having translucent fluff, comprising:

capturing means for optically capturing at least twice color input images A, C of the yarn using different background images (G1, G2);

storage means for storing the captured color input images;

means for solving X and D in the system of equations $$A = G1 + (X - G1)D$$

$$C = G2 + (X - G2)D$$

wherein X is a color image of the yarn itself and D is a yarn opacity image;

means for changing the value of D to 0 for pixels in which the value of D is not greater than a first predetermined value, and to 1 for pixels in which the value of D is not smaller than a second predetermined value, the yarn opacity image D being 1 in pixels where the yarn is totally opaque, and being 0 in pixels where the yarn is totally transparent; and storing means for storing the obtained color image X of the yarn itself and the yarn opacity image D as a yarn color image (X,D).

6. The yarn image creation device of claim 5, wherein said capturing means is a color scanner provided with a cover, the yarn is set in the color scanner, the color input image A of the yarn is captured with the cover open, and the color input image C of the yarn is captured with the cover closed.

7. The yarn image creation device of claim 5, further comprising means for using the obtained yarn color image (X,D) to create a simulated image of a textile product using the yarn.

8. A yarn image creation program stored on a computer readable medium for creating a color image of yarn having translucent fluff, comprising:

a computer instruction for storing color input images A, C of the yarn captured optically at least twice using different background images (G1, G2);

a computer instruction for solving X and D in the system of equations $$A = G1 + (X - G1)D$$

$$C = G2 + (X - G2)D$$

wherein X is a color image of the yarn itself and D is a yarn opacity image;

a computer instruction for changing the value of D to 0 for pixels in which the value of D is not greater than a first predetermined value, and to 1 for pixels in which the value of D is not smaller a second predetermined value, the yarn opacity image D being 1 in pixels where the yarn is totally opaque, and being 0 in pixels where the yarn is totally transparent; and a computer instruction for storing the obtained color image X of the yarn itself and the yarn opacity image D as a yarn color image (X,D).

9. The yarn image creation program of claim 8, further comprising an instruction for using the obtained yarn color image (X,D) to create a simulated image of a textile product using the yarn.

* * * * *

UNITED STATES PATENT AND TRADEMARK OFFICE
CERTIFICATE OF CORRECTION

PATENT NO.        : 7,650,018 B2
APPLICATION NO.   : 10/587930
DATED             : January 19, 2010
INVENTOR(S)       : Maeiwa Tetsuji It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 562 days.

Signed and Sealed this

Twenty-eighth Day of December, 2010

David J. Kappos
*Director of the United States Patent and Trademark Office*